United States Patent
Bushell et al.

(10) Patent No.: US 9,129,243 B2
(45) Date of Patent: Sep. 8, 2015

(54) APPARATUS AND METHODS FOR STRATEGIC PLANNING BY UTILIZING ROADMAPPING

(75) Inventors: Donald K. Bushell, Kent, WA (US); Robert L. Maki, Mill Creek, WA (US); Lee Dodd, North Bend, WA (US); Michael S. Hren, Maple Valley, WA (US); Janice L. Hinson, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 861 days.

(21) Appl. No.: 12/131,891

(22) Filed: Jun. 2, 2008

(65) Prior Publication Data

US 2009/0048882 A1   Feb. 19, 2009

Related U.S. Application Data (60) Provisional application No. 60/941,576, filed on Jun. 1, 2007.

(51) Int. Cl.
G06Q 10/06 (2012.01)

(52) U.S. Cl.
CPC ............ *G06Q 10/0633* (2013.01); *G06Q 10/06* (2013.01); *G06Q 10/067* (2013.01); *G06Q 10/0637* (2013.01); *G06Q 10/06316* (2013.01)

(58) Field of Classification Search
CPC ................... G06Q 10/0633; G06Q 10/06316; G06Q 10/06313; G06Q 10/0637; G06Q 10/067
USPC ...................... 705/7.26, 7.27, 348, 7.36, 7.23
See application file for complete search history.

(56) References Cited

U.S. PATENT DOCUMENTS

| | | | | |
|---|---|---|---|---|
| 5,537,524 A * | 7/1996 | Aprile | ............................ | 345/440 |
| 5,630,069 A * | 5/1997 | Flores et al. | ...................... | 705/7 |
| 5,734,837 A * | 3/1998 | Flores et al. | ...................... | 705/7 |
| 6,023,572 A * | 2/2000 | Lautzenheiser et al. | .......... | 705/7 |
| 6,073,109 A * | 6/2000 | Flores et al. | ...................... | 705/8 |
| 6,308,281 B1 * | 10/2001 | Hall et al. | ...................... | 714/4.4 |
| 6,604,114 B1 * | 8/2003 | Toong et al. | ........... | 707/999.104 |
| 6,970,844 B1 * | 11/2005 | Bierenbaum | .................... | 705/39 |
| 7,596,416 B1 * | 9/2009 | Maluf et al. | ...................... | 700/1 |
| 7,805,327 B1 * | 9/2010 | Schulz et al. | ..................... | 705/9 |
| 2003/0005406 A1 * | 1/2003 | Lin et al. | ...................... | 717/102 |
| 2003/0225602 A1 * | 12/2003 | Hagmann et al. | .................. | 705/7 |
| 2003/0225607 A1 * | 12/2003 | Kopunovic et al. | ............... | 705/9 |
| 2004/0002883 A1 * | 1/2004 | Andrews et al. | ................... | 705/8 |
| 2004/0008175 A1 * | 1/2004 | Elder et al. | ..................... | 345/100 |
| 2004/0080770 A1 * | 4/2004 | Hirose et al. | ................. | 358/1.13 |
| 2004/0083448 A1 * | 4/2004 | Schulz et al. | ................. | 717/101 |

(Continued)

OTHER PUBLICATIONS

Troux Technologies, "Corporate Fact Sheet," Obtained via archives of May 13, 2006 from the Wayback Machine.*

(Continued)

*Primary Examiner* — Ivan R Goldberg
(74) *Attorney, Agent, or Firm* — Patterson + Sheridan, LLP (57) ABSTRACT

A system for performing strategic planning. At least one processor and memory are configured to, based on user input, provide a plurality of roadmaps, and link a data point of a first roadmap to a data point of a second roadmap to integrate at least portions of the first and second roadmaps. "Intelligent" roadmapping can be provided wherein the system scans relationships in data from different sources and loads related categories and data points onto a combined roadmap.

12 Claims, 9 Drawing Sheets

(56) References Cited

U.S. PATENT DOCUMENTS

| | | | |
|---|---|---|---|
| 2004/0133555 A1* | 7/2004 | Toong et al. | 707/2 |
| 2005/0165734 A1* | 7/2005 | Vicars et al. | 707/2 |
| 2006/0047646 A1* | 3/2006 | Maluf et al. | 707/4 |
| 2006/0106825 A1* | 5/2006 | Cozzi | 707/100 |
| 2006/0242606 A1* | 10/2006 | Lin | 715/855 |
| 2006/0253289 A1* | 11/2006 | Kymal et al. | 705/1 |
| 2006/0293941 A1* | 12/2006 | Ivanov et al. | 705/8 |
| 2007/0055558 A1* | 3/2007 | Shanahan et al. | 705/7 |
| 2007/0250365 A1* | 10/2007 | Chakrabarti et al. | 705/8 |
| 2008/0065448 A1* | 3/2008 | Hull et al. | 705/8 |
| 2008/0115082 A1* | 5/2008 | Simmons et al. | 715/804 |

OTHER PUBLICATIONS

Ernst, "Tool Support for Enterprise Architecture Management—Strengths and Weaknesses," 2006, Proc. of the 10th IEEE Int'l Enterprise Distributed Object Computing Conference.*

Computas website, 2004, http://www.computas.com/, retrieved from Internet archive.*

Trouxmetis website, Apr. 18, 2006, http://www.computas.com/, retrieved from Internet archive.*

Dragstra, "Enterprise Architecture," Apr. 2005, Master's Thesis, Department of Mathematics and Computing Science, retrieved from http://alexandria.tue.nl/extra2/afstversl/wsk-i/dragstra2005.pdf.*

Dragstra, "Enterprise Architecture," Apr. 2005, Master's Thesis, Department of Mathematics and Computing Science, available at http://alexandria.tue.nl/extra2/afstversl/wsk-i/dragstra2005.pdf.*

Duckles, "Purdue's Center for Technology Roadmapping: A Resource for Research and Education in Technology Roadmapping," 2002, Engineering Management Conference, IEMC '02, vol. 2, pp. 900-904.*

"The Learning Trust" website, http://www.learningtrust.com, dated Mar. 19, 2003 and Apr. 17, 2003, from the Internet Archive.* van der Aalst, "Process mining: a research agenda," 2004, Computers in Industry, vol. 53, pp. 231-244.*

Rinne, "Technology roadmaps: Infrastructure for innovation," 2004, Technological Forecasting & Social Change, vol. 71, pp. 67-80.*

Vision Strategist is the currently recognized Enterprise System for Roadmapping. The website is http://www.alignent.com/products/visionstrategist/, 2008.

Lee Sherman, "Enterprise Modeling Tools—Map business operations to enterprise infrastructure using architectural models", Enterprise Architect, May 4, 2007, 6 pages.

* cited by examiner

Single Source of Process Information (SSPI) views in TPART format

SSV_TPART_Elements
- Element_Source_ID PK
- Element_Prefix_ID PK
- Element_ID PK
- Element_Type_ID FK
- Element_ID FK
- Element_Aero
- Element_Title
- Element_Decription

SSV_TPART_Element_Relations
- Related_Element_Source_ID FK
- Related_Element_Prefix_ID PK
- Related_Element_ID PK
- Element_Source_ID FK
- Element_Prefix_ID FK
- Element_ID FK
- Relationship_Level_ID FK

SSV_TPART_Element_Ownership
- Element_Source_ID PK
- Element_Prefix_ID PK
- Element_ID PK
- Role_Type_ID PK
- Participant_ID PK

7E7_Arch views in TPART format

VW_Elements
- Element_Source_ID PK
- Element_Prefix_ID PK
- Element_ID PK
- Element_Type_ID FK
- Element_ID FK
- Element_Aero
- Element_Title
- Element_Decription

VW_Related_Elements
- Related_Element_Source_ID FK
- Related_Element_Prefix_ID PK
- Related_Element_ID PK
- Element_Source_ID FK
- Element_Prefix_ID FK
- Element_ID FK
- Relationship_Level_ID FK

VW_7E7_Milestones
- Milestone_Source_ID PK
- Milestone_Prefix_ID PK
- Milestone_ID PK
- Element_Source_ID FK
- Element_Prefix_ID FK
- Element_ID FK
- Milestone_Type_ID FK
- Confidence_Level_ID FK
- Security_ID FK
- Milestone_Date
- Milestone_Cost
- Milestone_Title
- Milestone_Description

Boeing Lookup Everything System (BLUES)

BLUES LDAP
- BemsID PK
- Participant_Name

WSSO
- Http_CGI_BemsID

IROM - Integrated Release Outage Management

Blockpoints
- Element_Source_ID
- Element_Prefix_ID PK
- Element_ID PK
- Element_Type_ID FK
- Security_ID FK
- Element_Aero
- Element_Title
- Element_Description

Applications affected by Blockpoints
- Related_Element_Source_ID FK
- Related_Element_Prefix_ID PK
- Related_Element_ID PK
- Element_Source_ID FK
- Element_Prefix_ID FK
- Element_ID FK
- Relationship_Level_ID FK

SIS - Server Information System

Buildings
- Element_Source_ID
- Element_Prefix_ID PK
- Element_ID PK
- Element_Type_ID FK
- Security_ID FK
- Element_Aero
- Element_Title
- Element_Description

Servers hosted in buildings
- Related_Element_Source_ID FK
- Related_Element_Prefix_ID PK
- Related_Element_ID PK
- Element_Source_ID FK
- Element_Prefix_ID FK
- Element_ID FK
- Relationship_Level_ID FK

APPARATUS AND METHODS FOR STRATEGIC PLANNING BY UTILIZING ROADMAPPING

CROSS-REFERENCE TO RELATED APPLICATIONS

This application claims the benefit of U.S. Provisional Application No. 60/941,576 filed on Jun. 1, 2007. The disclosure of the above application is incorporated herein by reference in its entirety.

FIELD

The present disclosure relates generally to strategic analysis and planning.

BACKGROUND

The statements in this section merely provide background information related to the present disclosure and may not constitute prior art.

An enterprise may use roadmaps for strategic planning, e.g., in planning business strategy, computing strategy, business process evolution, computing technology, technology usage, and/or application evolution. Roadmapping data sources can exist in many forms in an enterprise. Data useful in roadmapping also may be provided by enterprise partners, suppliers and/or developers.

SUMMARY

The present disclosure, in one implementation, is directed to a system for performing strategic planning. At least one processor and memory are configured to, based on user input, provide a plurality of roadmaps, and link at least one data point of a first roadmap to at least one data point of a second roadmap to integrate at least portions of the first and second roadmaps.

In another implementation, the disclosure is directed to a system for use in performing strategic planning. At least one processor and memory are configured to analyze data from a plurality of databases to determine time-based relationships among points of the data, and in response to user input, combine at least some of the analyzed data points and relationships from more than one of the databases into a combined roadmap.

In yet another implementation, the disclosure is directed to a system-performed method for use in strategic planning. Based on user input, data is used from a plurality of data bases to provide a plurality of roadmaps. Based on user input, at least one data point of a first roadmap is linked to at least one data point of a second roadmap to integrate at least portions of the first and second roadmaps.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 3A, 3B, 3C and 3D illustrate a data model for a strategic planning system in accordance with one implementation of the disclosure;

DETAILED DESCRIPTION

The following description is merely exemplary in nature and is not intended to limit the present disclosure, application, or uses.

Figure 1:
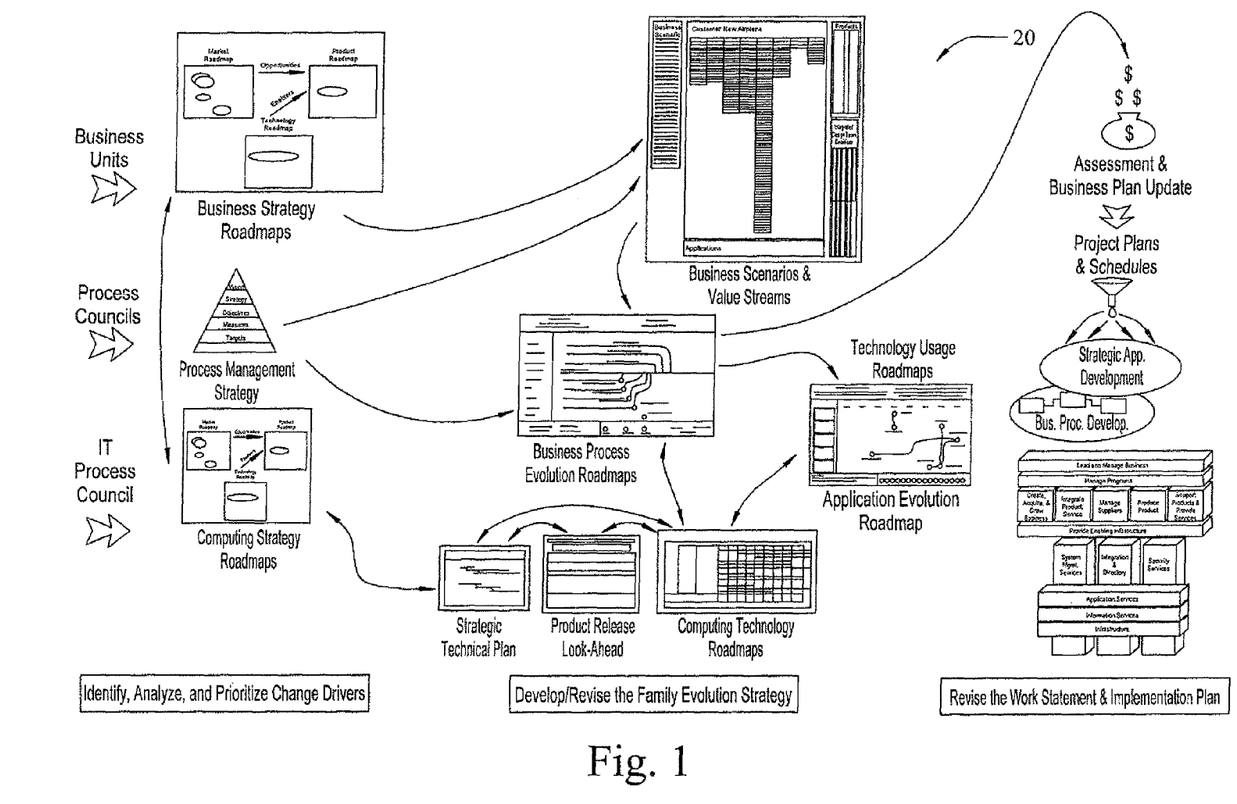
FIG. 1 is a diagram of a planning framework that utilizes a strategic planning system in accordance with one implementation of the disclosure.

An exemplary embodiment of a planning framework in which roadmapping is used is indicated generally in FIG. 1 by reference number 20. Roadmapping can be used by an enterprise, e.g., as a process to determine future market drivers and influences, as well as future products and associated needs and requirements. These elements in turn can drive technology development on sustaining and future products. In one implementation of the disclosure, a real-time software application is used to create roadmap models that graphically depict plans/projects and their potential risks. It should be noted generally that although some implementations are described in this disclosure as utilizing several commercial off-the-shelf (COTS) software products, the disclosure is not so limited. Other or additional COTS and/or non-COTS software could be used in various implementations.

Figure 2:
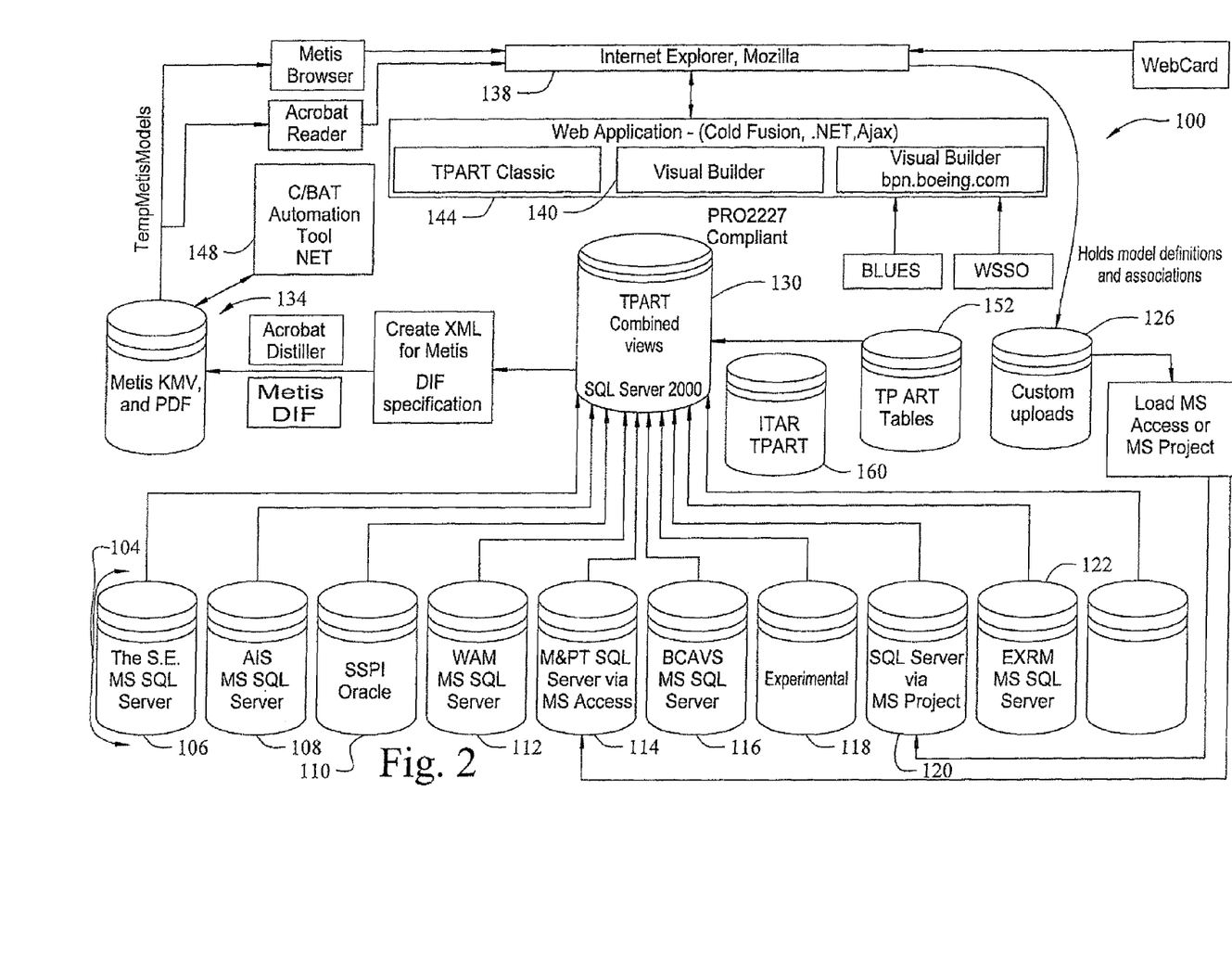
FIG. 2 is a diagram of an architecture for a strategic planning system in accordance with one implementation of the disclosure.
Figure 3A:
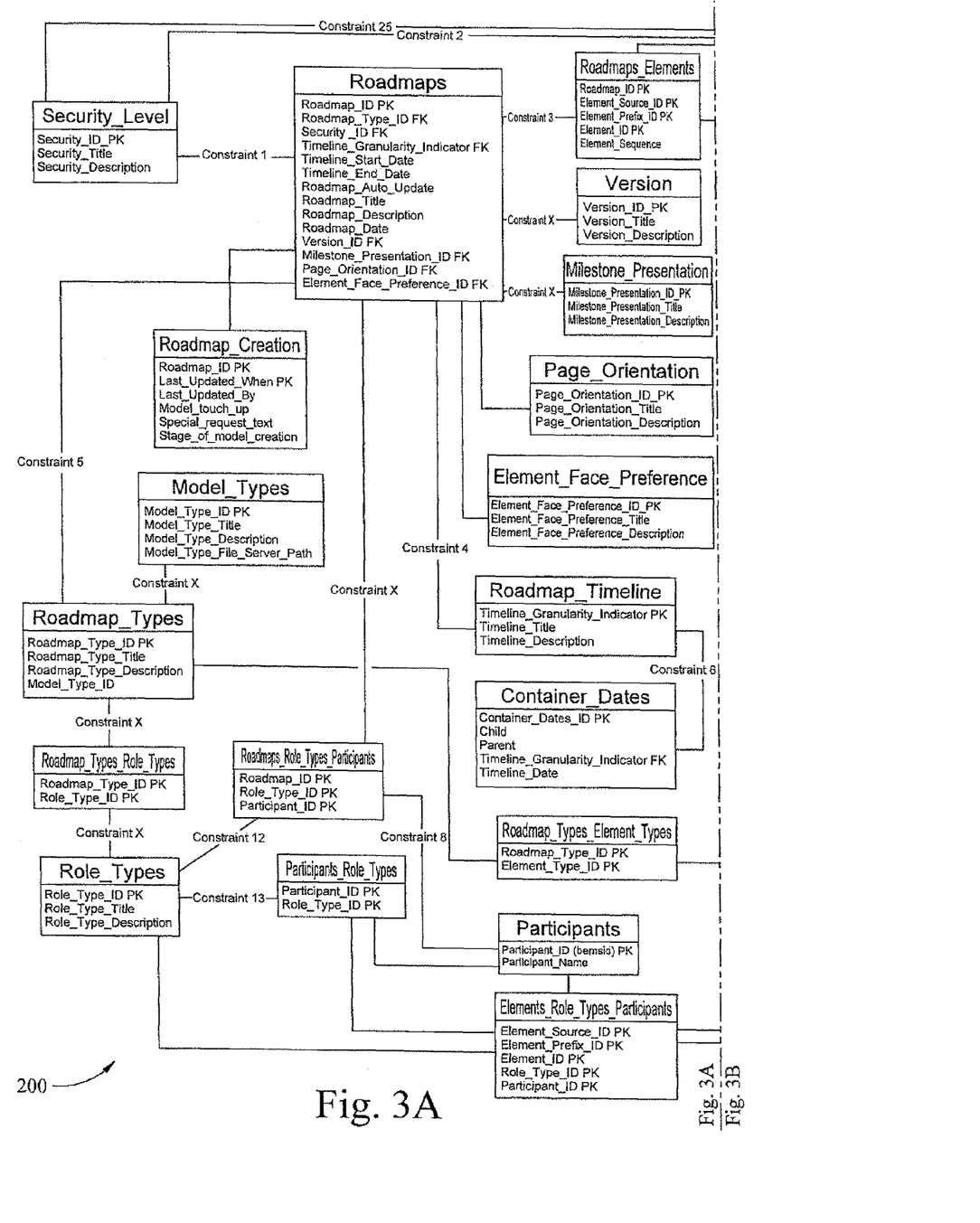
Figure 3B:
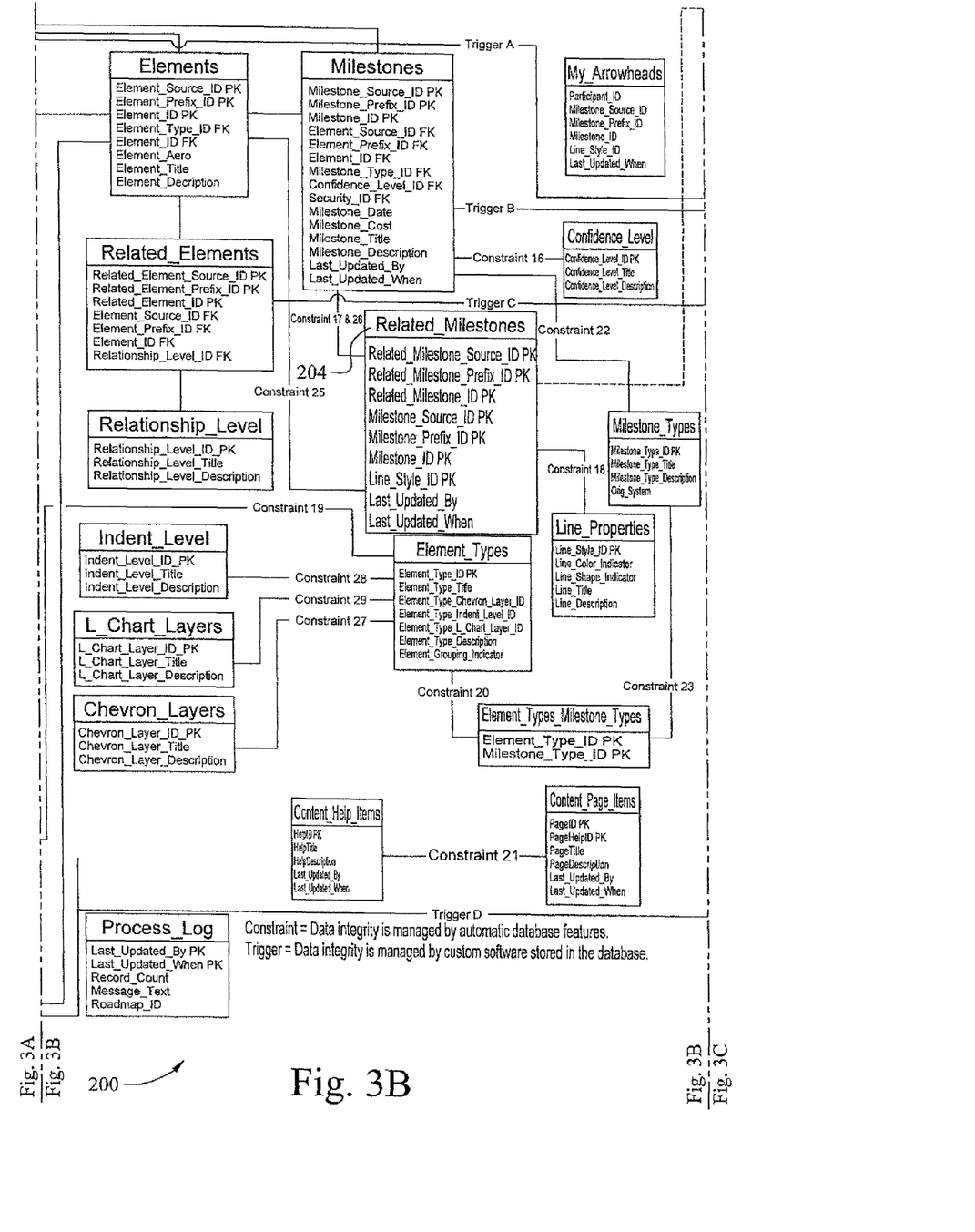
Figure 3C:
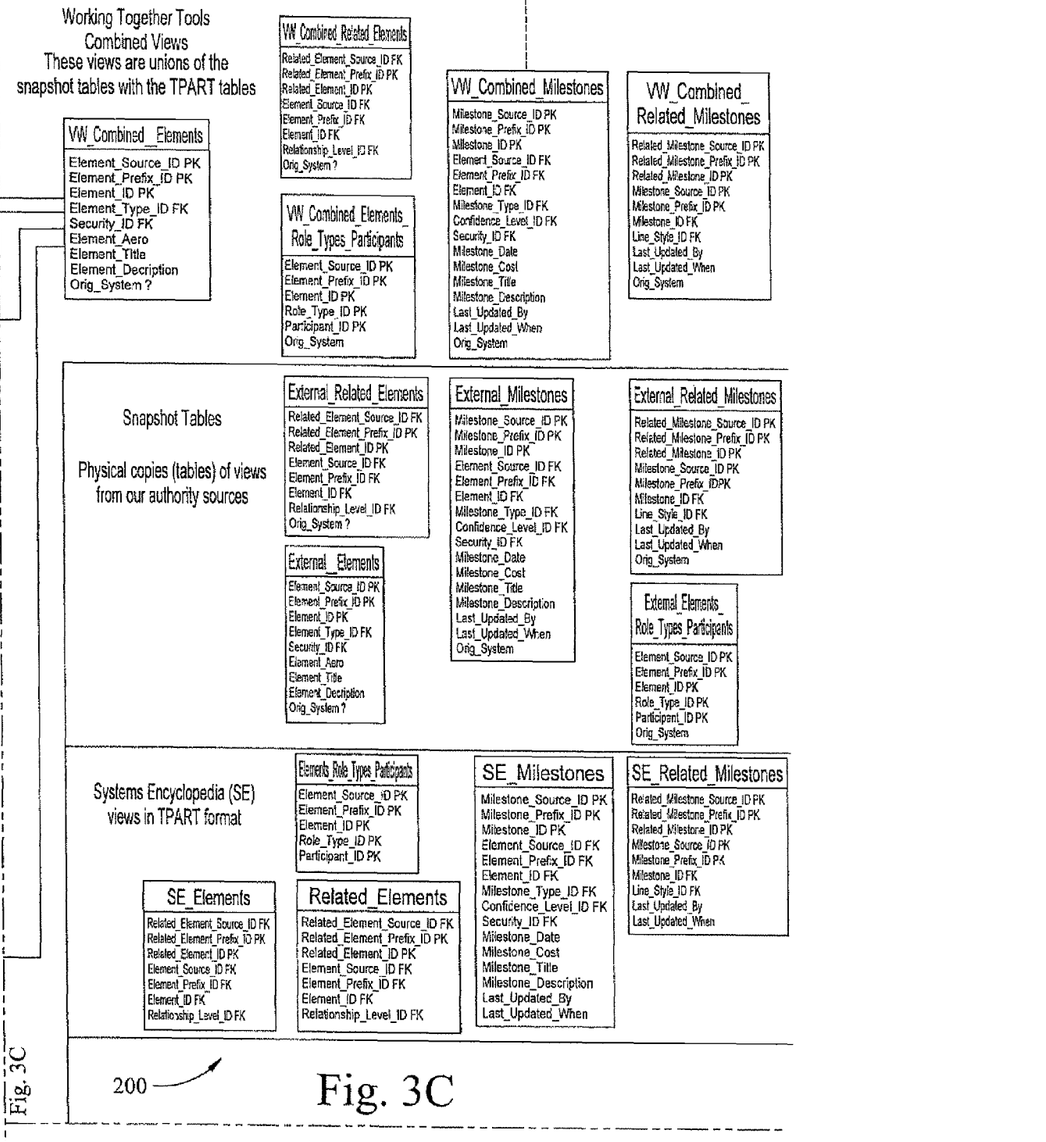

A strategic planning system in accordance with one implementation of the disclosure is a transition planning reporting tool, an exemplary architecture for which is indicated generally in FIG. 2 by reference number 100. The system 100 enables the creation and analysis of roadmap models. In the system 100, information from data sources 104 internal and/or external to the enterprise may be used in the system 100 for creating roadmaps. Such information may include but is not limited to data from an enterprise encyclopedia 106 that may contain, e.g., an inventory of computing applications used in the enterprise. Additionally or alternatively, data sources 104 may include architecture information 108 which may include, e.g., program activation date(s) for information technology computing applications. Other or additional data sources 104 include sources for business process information 110, management system information 112, and roadmap information 114 provided by strategy partners of the enterprise. Technology development strategy information 116 to support product development may be provided, e.g., via Vision Strategist, available from Alignent Software, Inc. Experimental data tables 118 allow users of the system 100 to prototype emerging requirements, e.g., before establishing a dedicated interface to the system 100. Information 120 may be provided as to program planning milestones, predecessors and successors, obtained, e.g., via project management software such as MS Project. Executive presentation roadmaps 122 may also be provided.

Various systems, e.g., Oracle, SQL Server, Teradata, MySQL, MS Access, MS Excel, and/or MS Project, may have been used to provide data available to the system 100 through data sources 104. In one implementation, users, e.g., outside the enterprise who have engaged in strategic planning sessions may store results of their strategic planning in a database 126. The results then may be loaded, e.g., via MS Access, MS Project, or directly, to a data source 104 for subsequent use in roadmapping as further described below.

The system 100 uses a server 130 to support combined views as further described below. The system 100 allows integration of data, e.g., Oracle, SQL Server, Teradata, MySQL, MS Access, MS Excel, and/or MS Project data, in roadmaps, e.g., to provide an extended enterprise view. In the system 100, data is periodically extracted from data sources 104, transformed and loaded to the server 130 and evaluated as to relationships with data from other data sources 104. The data is examined for conformity to logical constructs based, e.g., on date. For example, a data point that includes a market release date for a product may be linked to a data point that includes a readiness date for a technology needed to produce the product. If the product release date is earlier than the technology readiness date, the relationship is indicated as being improperly sequenced. Such evaluations may be performed using, e.g., Structured Query Language (SQL). In one implementation, tables are created and stored in the server 130 for linking data points between data sources 104. The data in turn may be modified for use by a modeling tool referred to generally by reference number 134, e.g., Metis, available from Troux Technologies, Inc. at www.troux.com.

A computer may be used to access the system 100 via a web browser 138. A web application 140, referred to herein as "Visual Builder", allows authorized users to drag-drop data points on a graphical interface to integrate and/or link roadmaps. A web application 144 allows a user to define the contents of a Metis model. A Model Cloner/Builder Administrator Studio (CBAS) 148 allows a user to create models expeditiously, based on previously stored models. For example, there can be dynamic integration with a Metis application programming interface (API) within the system 100. The CBAS tool 148 is a ".net" application that supports Metis model automation, allowing creation of roadmap(s) on demand. Model definitions and associations may be stored in tables 152, which may be provided as input to the modeling tool 134 via the combined views 130. In some implementations, users may input model definitions and associations for creating roadmaps directly into the tables 152.

The system 100 can identify and route International Traffic In Arms Regulations (ITAR)-sensitive database references to a secure ITAR database instance 160 in the system 100. The system 100 can analyze pertinent data and determine whether any ITAR data is involved and take restrictive action, such as excluding non-authorized people from seeing the data. The system 100 may secure extremely sensitive data, e.g., by an individual personal ID number, so that only authorized persons can see the data. The system 100 manages data and roadmaps in accordance with predefined security procedures. The system 100 can secure data to the record level for those people who have a need to know. The system 100 can distinguish data based, e.g., on data types, including but not necessarily limited to public knowledge, company knowledge, and knowledge known by an explicitly limited group of people.

An exemplary data model is indicated generally in FIGS. 3A, 3B, 3C and 3D by reference number 200. It should be noted that the system 100 manipulates submitted data to provide relationships among data points that could not be provided, e.g., through the modeling tool 134 without manual intervention. For example, a table 204 named Related_Milestones is used in linking data points from more than one data source 104 (and in some implementations from more than one enterprise.)

Figure 4:
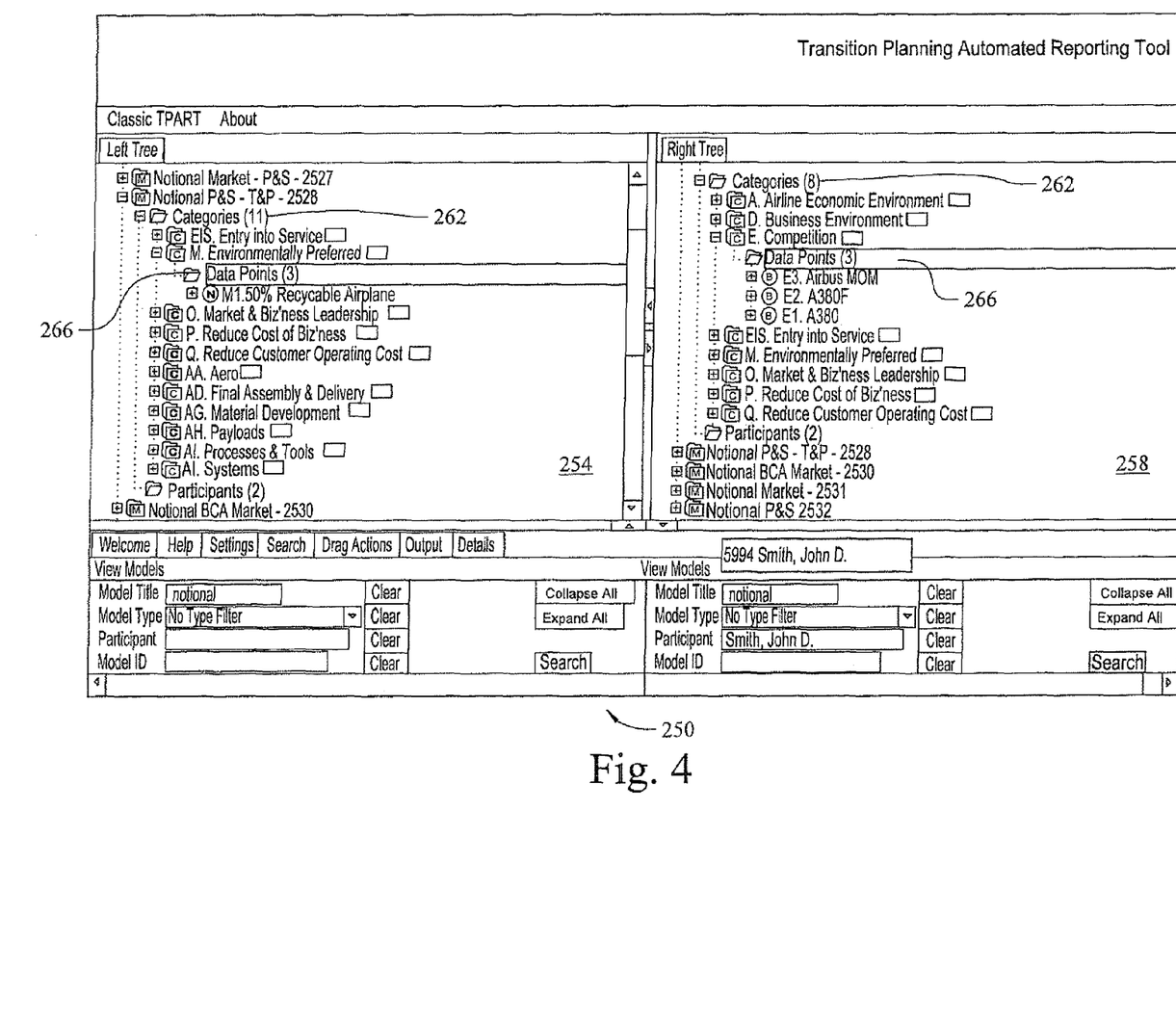
FIG. 4 is a screen shot of an explorer tree user interface for use in a strategic planning system in accordance with one implementation of the disclosure.

The system 100 allows a user to link data points within the Visual Builder 140. The system 100 then creates a roadmap model showing the data points in context of related categories. In such manner, a user is allowed to analyze scenarios to determine their likelihood of success or failure based on data provided from authority sources. The system 100 presents roadmapping data on a HTML based web site viewable via typical web browsers, e.g., in the form of an explorer tree interface indicated generally in FIG. 4 by reference number 250. Two roadmaps 254 and 258 are shown which include categories 262 of data points 266. A user may "drop-drag" one or more data points 266 from one tree to the other tree. Linked roadmaps are created when data points 266 (also known as milestones) are dragged from one tree to another, e.g., onto another data point 266. "Intelligent" roadmapping is provided wherein the system 100 scans relationships in the data and loads related categories and data points onto a combined roadmap.

Figure 5:
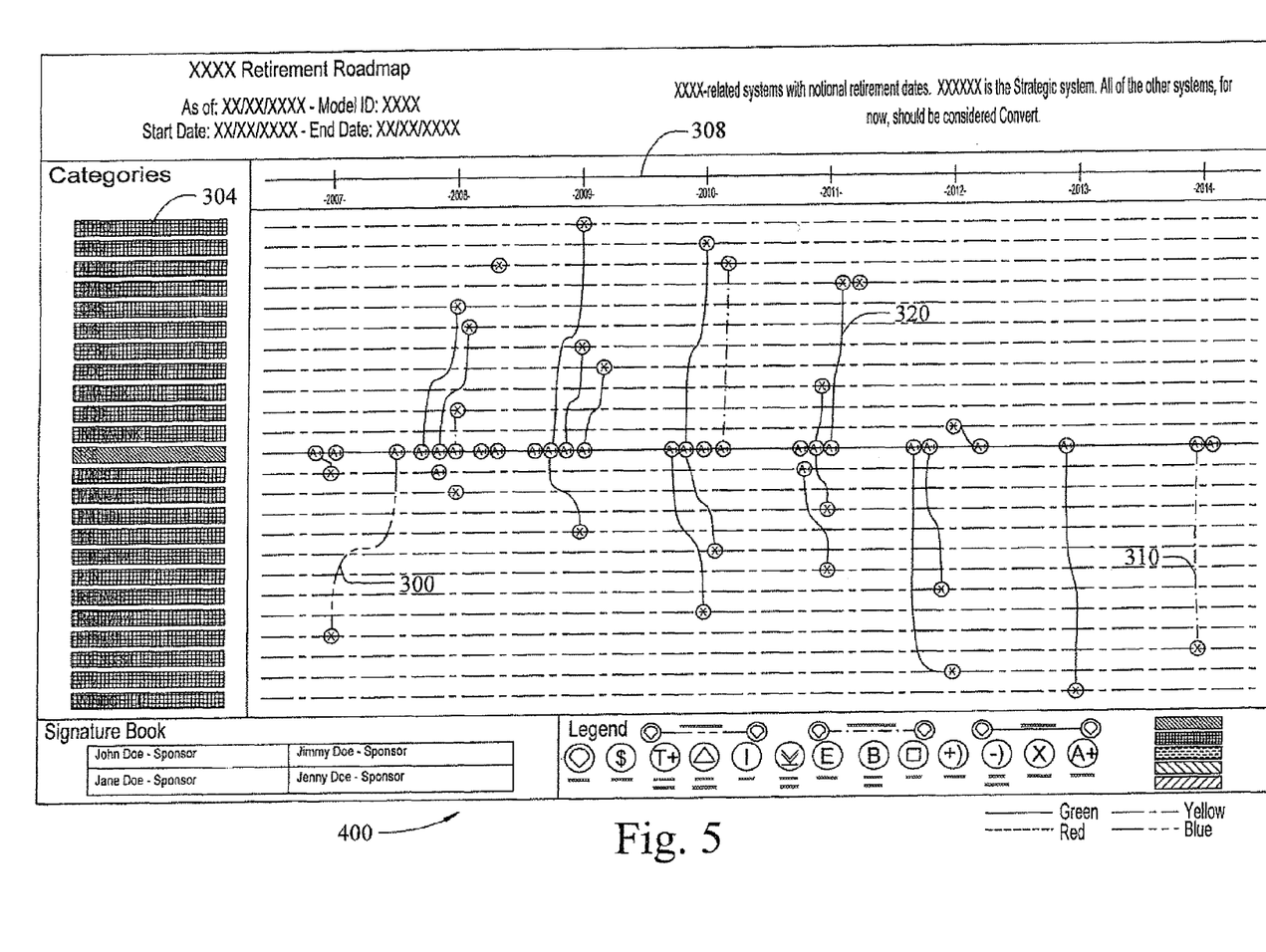
FIGS. 5 and 6 are roadmaps of a strategic planning system in accordance with one implementation of the disclosure.
Figure 6:
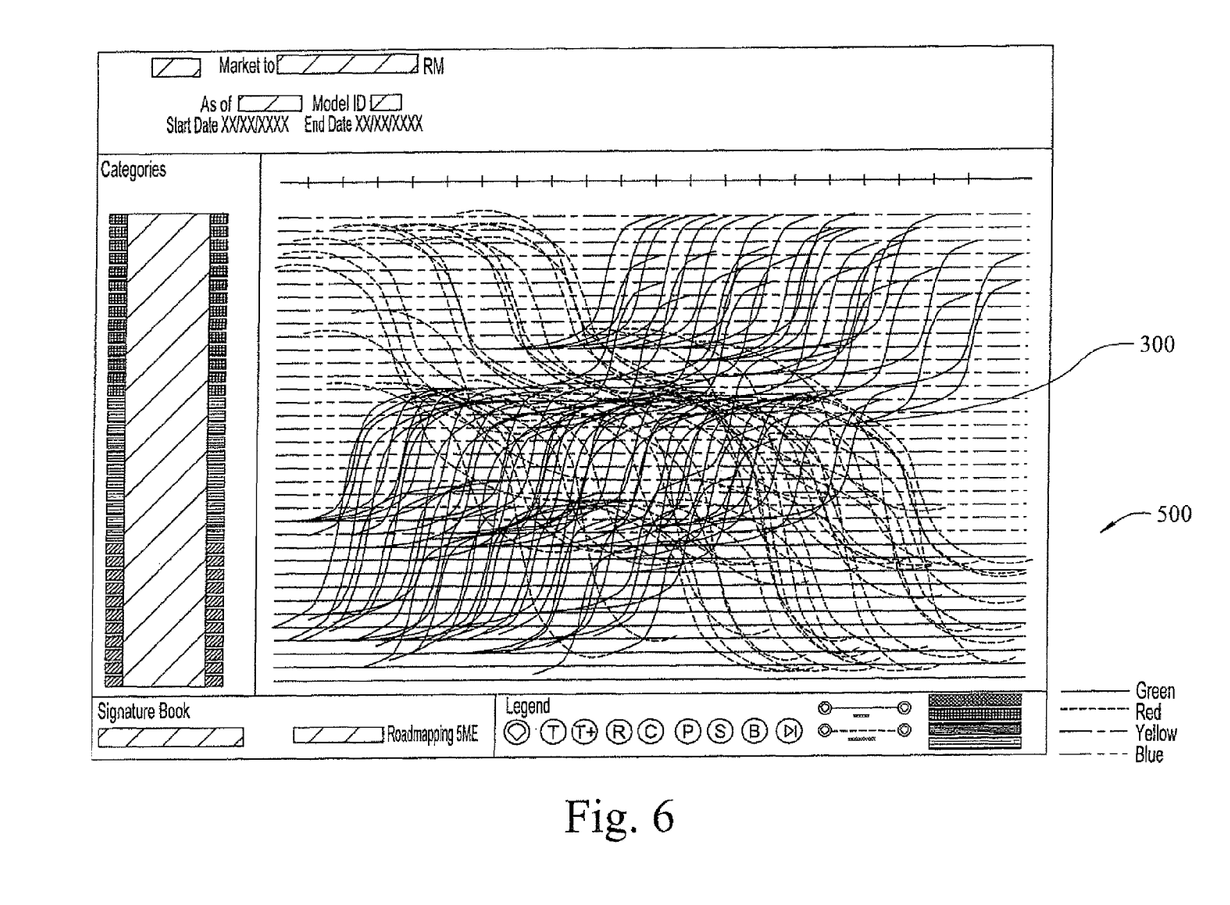

An exemplary roadmap is indicated generally in FIG. 5 by reference number 400. Categories 304 are listed vertically next to the roadmap. A category 304 is typically an area of concern in a roadmap and could be one of a variety of types, e.g., market-related, production-related, etc. Time is represented across a horizontal axis 308. The system 100 performs "visual sequencing". That is, the system 100 searches and analyzes data to determine whether linked data points are properly sequenced, then may present such analysis to viewers using the system 100, e.g., in the form of colored/styled linkage lines via the modeling tool 134. Green lines may be used to represent properly sequenced relationships. Red lines may be used to show any problem relationships. As previously discussed, relationships provided to the system 100 may be analyzed, e.g., via SQL queries, to determine whether dates at each end of a relationship are in order. Roadmap line colors are established based on applicable business logic. The concept of being "in order" may vary among users and the system 100 can apply line colors based on the business requirements of a particular user. In FIG. 5, a single line 300 is red, indicating an improperly sequenced linking of data points. A single line 310 is blue, indicating a sequencing that is too close to determine whether the linking is proper or improper. All other lines 320 in FIG. 5 are green. Another roadmap implementation, indicated generally in FIG. 6 by reference number 500, includes a large number of red lines 300 that could indicate a need for additional planning evaluation. It should be noted that in various implementations, a user need not specify time when linking data points. The system 100 determines time sequencing based on the data point relationships.

The system 100 provides a "find neighborhood" script to allow a user to analyze, based on relationships, a highly complex roadmap and generate text reports. For example, the user may decide to analyze data points in proximity to one or more data points that had been displayed as problematic in a combined roadmap. In such manner, the user may determine, e.g., whether a problematic date associated with a given data point, e.g., a date to which an event is postponed for some reason, might have an adverse impact on other goals reflected on the roadmap. A user may perform analysis of a roadmap, view it graphically and create a text report of the results with graphical support that can be printed. The system 100 has the capability to apply line colors and patterns, and object colors and fill patterns, to match to a user's thinking pattern, to deliver a more usable roadmap or system flow model. The system 100 user interface is designed to emulate an end result in the modeling tool 134, e.g., in Metis. This capability is empowered by a data structure that can store all the intelligence to be provided to Metis. In the same or similar manner as MS Access, Metis can be used essentially to provide a user interface of the system 100.

The system 100 has the ability to generate PowerPoint equivalent models in Metis that can be, e.g., pasted into an executive level presentation. Executive roadmaps and standard system roadmaps can be made available for architects to create a planning chart, based on notional data provided, e.g., in MS Access or authoritative data, e.g., from an enterprise system encyclopedia or other authoritative source.

An interface of the system 100 to a project management tool such as Microsoft Project allows a project manager to create system 100 roadmaps from a MS Project file to identify out-of-sequence planning conditions. The system 100 may include re-usable SQL load scripts to access MS Project data and specifically predecessors and successors, analyze the relationships and create a graphical Metis model showing where any disconnects and schedule difficulties lie.

The system 100 can interface with a database management tool such as Microsoft Access to provide a capability for nearly any computer user to create system 100 roadmaps. MS Access templates may be used to enhance the usability of the system 100. The system 100 may include re-usable SQL load scripts for taking user planning data, loading it into the system 100 and generating Metis models, e.g., essentially immediately thereafter. The user can obtain a graphical representation in Metis substantially immediately after submission of the data. The user can analyze the graphic and update the MS Access data and re-submit repeatedly. MS Access may provide the authority data.

The system 100 can provide custom symbols and/or artwork to convey information at a data point level. Symbols may be designed to scale within Metis, e.g., to handle roadmap complexity when printed to a plotter. Metis models generated in the system 100 include hide/show icons which allow the user to down select a model and simplify it to contain only those datapoint types the user wishes to see. A user interface may be designed to emulate lines and fill colors of a modeling tool result. Roadmap models may support planning, e.g., from one day through 100 years. It also is contemplated that in some configurations, very small time scales, e.g., nanoseconds, could be supported.

The system 100 has been designed to enable new users to quickly learn, e.g., within an hour, how to use the system, as opposed to days. The system is intuitive and minimizes the need for manual interfacing to perform basic tasks. It is able to import and export data and is flexible to meet emerging customer requirements. Other software packages do not have the abilities of the system 100 to perform real time analysis of roadmaps or generate reports based on the roadmap analysis.

The system 100 is Web-based and may be used, e.g., by persons having appropriate security authorization. Other software tools typically do not provide the capability for performance of visual sequencing, real time analysis of roadmaps, functionalities such as drag and drop of data points, or the ability to provide a simultaneous view of two independent sets of roadmaps.

Various systems and methods in accordance with the disclosure can be used to facilitate joint strategic planning between a company and its partners, suppliers and developers, enabling them to reduce overall flow time and technology development costs. The foregoing system provides a platform for building roadmaps and models for a company and its internal organizations to align technology development to meet current and future program requirements in a cost efficient timely manner. The system enables users to analyze their roadmaps/models in real time to determine roadblocks, new markets/strategies, alternative technology development scenarios, missing requirements and more. Roadmaps from an assortment of groups can be readily shared among the groups to align technology development to product needs and requirements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:
1. A system for use in performing strategic planning for a given enterprise, the system comprising:
at least one processor; and
a memory containing computer-readable program code that, when executed by operation of the at least one processor, performs an operation comprising:
a) extracting different types of data from a plurality of database computer systems associated with a plurality of independent enterprises, through a plurality of different data tool types;
b) constructing first and second roadmap models from the extracted data based on stored model definitions and associations, each roadmap model comprising a respective plurality of data points generated based on a respective portion of the extracted data and the model definitions and associations, wherein each of the plurality of data points corresponds to one or more categories;
c) determining a plurality of relationships between data points from the first roadmap model and data points from the second roadmap model based on the respective corresponding one or more categories for the data points;
d) creating a combined roadmap model that includes (i) related categories of information shared between the first and second roadmap models and (ii) additional data points, based on the determined plurality of relationships between the first and second roadmap models;
e) graphically displaying linked data points relative to a timeline using the combined roadmap model and based on the plurality of relationships; and
f) outputting, for display on a website viewable via a web browser, a graphical depiction of results of a visual sequencing operation to evaluate sequencing of the graphically displayed linked data points with respect to time by applying structured query language (SQL) queries to the extracted types of data to determine whether dates at each end of the plurality of relationships are in sequential order, the outputting comprising:
upon determining that a first one or more of the linked data points represent an improper sequence, outputting a depiction of the first one or more linked data points in a first visual style;
upon determining that a second one or more of the linked data points represent a proper sequence, outputting a depiction of the second one or more linked data points in a second visual style; and
upon determining that a third one or more of the linked data points are sequenced too close in time to determine whether the sequencing is proper or improper, outputting a depiction of the third one or more linked data points in a third visual style,
wherein the first visual style, second visual style and third visual style are distinct from one another.

2. The system of claim 1, wherein the first visual style, second visual style and third visual style each comprise a respective line in a respective color on the graphical indication of results of the visual sequencing operation.

3. The system of claim 1, wherein a plurality of categories of information are also listed adjacent the graphically displayed linked data points on a display.

4. The system of claim 1, wherein the data sources comprise at least one of: business process information, management system information, technology development strategy information, an inventory of computing applications, architecture information, and an enterprise encyclopedia.

5. A method for performing strategic planning for a given enterprise, the method comprising:
   a) extracting, by a processor, different types of data from a plurality of database computer systems associated with a plurality of independent enterprises, through a plurality of different data tool types;
   b) constructing, by the processor, first and second roadmap models from the extracted data based on stored model definitions and associations, each roadmap model comprising a respective plurality of data points generated based on a respective portion of the extracted data and the model definitions and associations, wherein each of the plurality of data points corresponds to one or more categories;
   c) determining, by the processor, a plurality of relationships between data points from the first roadmap model and data points from the second roadmap model based on the respective corresponding one or more categories for the data points;
   d) creating, by the processor, a combined roadmap model that includes (i) related categories of information shared between the first and second roadmap models and (ii) additional data points, based on the determined plurality of relationships between the first and second roadmap models;
   e) graphically displaying, by the processor, linked data points relative to a timeline using the combined roadmap model and based on the plurality of relationships; and
   f) outputting, by the processor for display on a website viewable via a web browser, a graphical depiction of results of a visual sequencing operation to evaluate sequencing of-the graphically displayed linked data points with respect to time by applying structured query language (SQL) queries to the extracted types of data to determine whether dates at each end of the plurality of relationships are in sequential order, the outputting comprising:
      upon determining that a first one or more of the linked data points represent an improper sequence, outputting a depiction of the first one or more linked data points in a first visual style;
      upon determining that a second one or more of the linked data points represent a proper sequence, outputting a depiction of the second one or more linked data points in a second visual style; and
      upon determining that a third one or more of the linked data points are sequenced too close in time to determine whether the sequencing is proper or improper, outputting a depiction of the third one or more linked data points in a third visual style,
   wherein the first visual style, second visual style and third visual style are distinct from one another.

6. The method of claim 5, wherein the first visual style, second visual style and third visual style each comprise a respective line in a respective color on the graphical indication of results of the visual sequencing operation.

7. The method of claim 5, wherein a plurality of categories of information are also listed adjacent the graphically displayed linked data points on a display.

8. The method of claim 5, wherein the data sources comprise at least one of: business process information, management system information, technology development strategy information, an inventory of computing applications, architecture information, and an enterprise encyclopedia.

9. A non-transitory computer-readable medium containing computer program code that, when executed, performs an operation comprising:
   a) extracting different types of data from a plurality of database computer systems associated with a plurality of independent enterprises, through a plurality of different data tool types;
   b) constructing first and second roadmap models from the extracted data based on stored model definitions and associations, each roadmap model comprising a respective plurality of data points generated based on a respective portion of the extracted data and the model definitions and associations, wherein each of the plurality of data points corresponds to one or more categories;
   c) determining a plurality of relationships between data points from the first roadmap model and data points from the second roadmap model based on the respective corresponding one or more categories for the data points;
   d) creating a combined roadmap model that includes (i) related categories of information shared between the first and second roadmap models and (ii) additional data points, based on the determined plurality of relationships between the first and second roadmap models;
   e) graphically displaying linked data points relative to a timeline using the combined roadmap model and based on the plurality of relationships; and
   f) outputting, for display on a website viewable via a web browser, a graphical depiction of results of a visual sequencing operation to evaluate sequencing of the graphically displayed linked data points with respect to time by applying structured query language (SQL) queries to the extracted types of data to determine whether dates at each end of the plurality of relationships are in sequential order, the outputting comprising:
      upon determining that a first one or more of the linked data points represent an improper sequence, outputting a depiction of the first one or more linked data points in a first visual style;
      upon determining that a second one or more of the linked data points represent a proper sequence, outputting a depiction of the second one or more linked data points in a second visual style; and
      upon determining that a third one or more of the linked data points are sequenced too close in time to determine whether the sequencing is proper or improper, outputting a depiction of the third one or more linked data points in a third visual style,
   wherein the first visual style, second visual style and third visual style are distinct from one another.

10. The non-transitory computer-readable medium of claim 9, wherein the first visual style, second visual style and third visual style each comprise a respective line in a respective color.

11. The non-transitory computer-readable medium of claim 9, wherein a plurality of categories of information are also listed adjacent the graphically displayed linked data points on a display.

12. The non-transitory computer-readable medium of claim 9, wherein the data sources comprise at least one of: business process information, management system information, technology development strategy information, an inventory of computing applications, architecture information, and an enterprise encyclopedia.

* * * * *